(12) United States Patent
Lin (10) Patent No.: US 10,706,165 B2
(45) Date of Patent: Jul. 7, 2020

(54) SYSTEM, METHOD AND DATABASE PROXY SERVER FOR SEPARATING OPERATIONS OF READ AND WRITE

(71) Applicant: Alibaba Group Holidng Limited, George Town, Grand Cayman (KY)

(72) Inventor: Xiaobin Lin, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 589 days.

(21) Appl. No.: 15/015,911

(22) Filed: Feb. 4, 2016

(65) Prior Publication Data

US 2016/0232372 A1 Aug. 11, 2016

(30) Foreign Application Priority Data

Feb. 5, 2015 (CN) .......................... 2015 1 0062422

(51) Int. Cl.
*G06F 21/62* (2013.01)
*H04L 29/08* (2006.01)

(52) U.S. Cl.
CPC ...... *G06F 21/6218* (2013.01); *H04L 67/2842* (2013.01); *G06F 2221/2105* (2013.01)

(58) Field of Classification Search
CPC ............... G06F 17/30392; G06F 21/31; G06F 2221/2131
See application file for complete search history.

(56) References Cited

U.S. PATENT DOCUMENTS

| | | | |
|---|---|---|---|
| 6,240,512 B1 | 5/2001 | Fang et al. | |
| 6,453,369 B1 * | 9/2002 | Imamura | G06F 21/80 710/200 |
| 6,523,032 B1 | 2/2003 | Sunkara et al. | |
| 7,360,082 B1 | 4/2008 | Berthold et al. | |
| 7,383,318 B2 | 6/2008 | Craik | |
| 7,546,432 B2 | 6/2009 | Stacey et al. | |
| 7,562,368 B2 | 7/2009 | Kanevsky et al. | |
| 7,664,781 B2 | 2/2010 | White, Jr. et al. | |
| 7,743,039 B2 | 6/2010 | Joners et al. | |

(Continued)

FOREIGN PATENT DOCUMENTS

| | | |
|---|---|---|
| CN | 102129434 | 7/2011 |
| CN | 102426594 | 4/2012 |

(Continued)

*Primary Examiner* — Taelor Kim
*Assistant Examiner* — Dawaune A Conyers (57) ABSTRACT

A method of separating read operations from write operations includes obtaining and storing a client ID after establishing a slave database connection with a slave database corresponding to a client, and receiving an operation request from the client. If the operation request is a write request, the method also includes establishing a master database connection with a master database by use of a public ID and a public passcode and sending the client ID to the master database, where upon receiving, the master database updates the public ID with the received client ID, and updates access permissions associated with the public ID with access permissions associated with the client ID. The method further includes sending the write request to the master database by use of the master database connection, where a write operation corresponding to the write request and to the access permissions associated with client ID is executed.

17 Claims, 9 Drawing Sheets

(56) References Cited

U.S. PATENT DOCUMENTS

| | | |
|---|---|---|
| 7,822,728 B1 | 10/2010 | Chandler et al. |
| 7,877,682 B2 | 1/2011 | Aegerter |
| 7,895,172 B2 | 2/2011 | Cooper et al. |
| 8,024,380 B2 | 9/2011 | Mishra |
| 8,150,808 B2 | 4/2012 | Zha et al. |
| 8,161,077 B2 | 4/2012 | Zha et al. |
| 8,176,014 B2 | 5/2012 | Jacobs et al. |
| 8,185,909 B2 | 5/2012 | Sigal et al. |
| 8,198,986 B2 | 6/2012 | Craik |
| 8,234,496 B1 | 7/2012 | Ding et al. |
| 8,296,324 B2 | 10/2012 | Strumpf et al. |
| 8,386,513 B2 | 2/2013 | Victor et al. |
| 8,560,690 B2 | 10/2013 | Chandrasekaran et al. |
| 8,564,417 B2 | 10/2013 | Craik |
| 8,566,361 B2 | 10/2013 | Zha et al. |
| 8,635,439 B2 | 1/2014 | Joshi et al. |
| 8,639,880 B2 | 1/2014 | Augenstein et al. |
| 8,762,253 B2 | 6/2014 | Ogundipe |
| 8,775,397 B2 | 7/2014 | Dong et al. |
| 8,972,972 B2 | 3/2015 | Stevenson |
| 9,032,017 B1 | 5/2015 | Singh et al. |
| 9,032,193 B2 | 5/2015 | Joshi et al. |
| 9,037,543 B2 | 5/2015 | Zha et al. |
| 9,037,612 B2 | 5/2015 | Zha et al. |
| 9,189,502 B2 | 11/2015 | Panteleenko et al. |
| 2004/0054779 A1 | 3/2004 | Takeshima et al. |
| 2005/0198322 A1* | 9/2005 | Takabayashi ....... H04L 63/0281 709/228 |
| 2006/0136735 A1* | 6/2006 | Plotkin ................. G06F 21/85 713/182 |
| 2008/0295146 A1 | 11/2008 | Sriram |
| 2011/0173684 A1* | 7/2011 | Hurry .................... G06F 21/33 726/6 |
| 2012/0131327 A1* | 5/2012 | Tomlinson ................ G06F 8/60 713/150 |
| 2012/0311003 A1 | 12/2012 | Kuznetsov et al. |
| 2013/0013921 A1* | 1/2013 | Bhathena ............. H04L 9/0825 713/168 |
| 2015/0379293 A1* | 12/2015 | Wang ................. G06F 21/6218 726/7 |

FOREIGN PATENT DOCUMENTS

| | | |
|---|---|---|
| CN | 102622427 | 8/2012 |
| CN | 102761528 | 10/2012 |
| CN | 103793432 | 5/2014 |
| CN | 102541923 | 6/2014 |
| CN | 102591964 | 7/2014 |
| CN | 104504145 | 4/2015 |
| EP | 2738695 | 6/2014 |

* cited by examiner

SYSTEM, METHOD AND DATABASE PROXY SERVER FOR SEPARATING OPERATIONS OF READ AND WRITE

CROSS REFERENCE TO RELATED APPLICATION

This application claims the benefits to Chinese Patent Application No. 201510062422.6, filed on Feb. 5, 2015, which is incorporated herein by reference in its entirety.

TECHNICAL FIELD

The present invention relates generally to communication technologies, and more particularly to a system, method and database proxy server for separating read operations and write operations.

BACKGROUND

Databases are warehouses that organize, store and manage data according to data structures. Data are stored collectively in a database in certain formats, providing data access for a multitude of clients. In order to facilitate multiple clients sharing databases and alleviate the limits imposed by one single database servicing multiple clients, currently a master database will be designated, which is duplicated into multiple slave databases having identical datasets as the master database. Further, techniques separating read operations from write operations are applied to the database system, i.e., a read request from a client (e.g., a query statement executed by the client) is directed to the slave databases; while a write request from the client (e.g., an update statement executed by the client) is directed to the master database.

The present techniques separating read operations from write operations can be implemented as the following. First, a database proxy server receives from a client a communication request for a connection to a slave database, where the request includes a client ID and a client passcode. Based upon the client ID, the database proxy server sends the request to a corresponding slave database. Upon receiving the request, the slave database obtains the client ID and the client passcode from the request, and performs verification of the client. If the client passes the verification, the slave database accordingly establishes a slave database connection with the database proxy server. Subsequently, the database proxy server receives from the client operation requests. If receiving a read request, the database proxy server executes a read operation corresponding to the read request against the slave database directly. If receiving a write request, the database proxy server establishes a master database connection with the master database by use of a public ID and a public passcode, and executes a write operation corresponding to the write request against the master database.

However, with the present techniques to separate read operations and write operations, multiple clients all rely on one common public ID to establish connections with the master database. The public ID has its access permission s set as the super set of all the clients' access permissions. Consequently, some clients can end up performing operations outside of their access permissions configured with the master database, over-extending their access permissions and imposing potential security risks. For example, client A has an original access permission configured as writing to only the A part of the master database. Client B has an original access permission configured as writing to both the A part and the B part of the master database. When client A and client B both utilize a common public ID to establish connections with the master database, the access permission associated with the public ID is set accordingly as writing to both the part A and the part B of the master database. Therefore, client A ends up being able to write to the part B of the database as well.

SUMMARY

According to an exemplary embodiment of the present disclosure, a method of separating a read operation from a write operation includes the step of a database server obtaining and storing a client ID after establishing a slave database connection with a slave database corresponding to a client. The method also includes the step of receiving an operation request from the client, and if the operation request is a write request, the method further includes the steps of the database server establishing a master database connection with a master database by use of a public ID and a public passcode, and sending the client ID to the master database. Upon receiving the client ID, the master database updates the public ID with the received client ID and updates access permissions associated with the public ID with access permissions associated with the client ID. The method further includes the database server sending the write request to the master database by use of the master database connection, where the master database executes a write operation corresponding to the write request and to the access permissions associated with client ID.

Alternatively, the step of obtaining and storing a client ID of the method includes the database server receiving a slave database connection request from the client, the connection request including a client ID and a client passcode. The step further includes the database server sending the connection request to the slave database corresponding to the client such that, upon receiving the connection request, the slave database obtains the client ID and the client passcode from the connection request. The slave database verifies the client by use of the obtained client ID and client passcode, and if the client is successfully verified, establishes the slave database connection with the database server. The step further includes obtaining and storing the client ID from the connection request.

Further alternatively, the method includes, after the step of the database server receiving an operation request from the client, if the operation request is a read request, the database server sending the read request through the slave database connection to the slave database corresponding to the client, where a read operation corresponding to the read request is executed against the slave database.

Still further alternatively, the step of establishing a master database connection with a master database by use of a public ID and a public passcode of the method includes the database server sending the public ID and the public passcode to the master database such that, upon receiving the public ID and the public passcode, the master database verifies the database server by use of the received public ID and public passcode. If the database server is successfully verified, the master database establishes the master database connection with the database server.

Yet further alternatively, the method further includes, after the step of the establishing the master database connection with the master database by use of the public ID and the public passcode, the database server caching the master database connection with the master database.

According to another exemplary embodiment of the present disclosure, a database server includes an obtaining module, a receiving module, an establishment module and a writing module. The obtaining module is configured for obtaining and storing a client ID after establishing a slave database connection with a slave database corresponding to a client. The receiving module is configured for receiving an operation request from the client. The establishment module is configured for, if the operation request is a write request, establishing a master database connection with a master database by use of a public ID and a public passcode and sending the client ID to the master database, where upon receiving the client ID, the master database updates the public ID with the received client ID, and access permissions associated with the public ID with access permissions associated with the client ID. And, the writing module is configured for sending the write request to the master database by use of the master database connection, where the master database executes a write operation corresponding to the write request and to the access permissions associated with client ID.

Alternatively, the obtaining module of the database server includes a receiving module, a sending module and a storing module. The receiving module is configured for receiving a slave database connection request from the client, the connection request including a client ID and a client passcode. The sending module is configured for sending the connection request to the slave database corresponding to the client, where upon receiving the connection request, the slave database obtains the client ID and the client passcode from the connection request, verifies the client by use of the obtained client ID and client passcode. If the client is successfully verified, the slave database establishes the slave database connection with the database server. And, the storing module is configured for obtaining and storing the client ID from the connection request.

Further alternatively, the database server further includes a read module configured for, if the operation request is a read request, sending the read request through the slave database connection to the slave database corresponding to the client. Subsequently, a read operation corresponding to the read request is executed against the slave database.

Still further alternatively, the establishment module includes a setup module configured for sending the public ID and the public passcode to the master database, where upon receiving the public ID and the public passcode, the master database verifies the database server by use of the received public ID and public passcode. If the database server is successfully verified, the master database establishes the master database connection with the database server.

Yet further alternatively, the database server further includes a cache module configured for, after establishing the master database connection with the master database by use of the public ID and the public passcode, caching the master database connection with the master database.

According to yet another exemplary embodiment of the present disclosure, a system for separating a read operation from a write operation includes a database server and a master database. The database server includes an obtaining module, a receiving module, an establishment module and a write module. The receiving module is configured for receiving an operation request the client. The establishment module is configured for, if the operation request is a write request, establishing a master database connection with the master database by use of a public ID and a public passcode and sending the client ID to the master database. The write module is configured for, after the master database updates access permissions associated with the public ID with access permissions associated with the client ID, sending the write request to the master database by use of the master database connection, where the master database executes a write operation corresponding to the write request and to the access permissions associated with the client ID. The master database includes an update module configured for receiving the client ID, updating the public ID with the received client ID, and updating the access permissions associated with the public ID with the access permissions associated with the client ID.

Alternatively, the obtaining module of the system includes a receiving module, a sending module and a storing module. The receiving module is configured for receiving a slave database connection request from the client, the connection request including a client ID and a client passcode. The sending module is configured for sending the connection request to a slave database corresponding to the client. The storing module is configured for, after the slave database connection is established with the slave database, obtaining and storing the client ID from the connection request. Correspondingly, the system further includes a slave database. The slave database include a first verification module configured for receiving the slave database connection request, obtaining the client ID and the client passcode from the connection request, and verifying the client with the obtained client ID and client passcode. If the client is verified successfully, the slave database connection is established with the database server.

Further alternatively, the database server of the system further includes a read module configured for, if the operation request is a read request, sending the read request through the slave database connection to the slave database corresponding to the client, where a read operation corresponding to the read request is executed against the slave database.

Still further alternatively, the establishment module of the system includes a setup module configured for sending the public ID and the public passcode to the master database. The master database of the system further includes a second verification module configured for receiving the public ID and the public passcode, verifying the database server by use of the received public ID and public passcode. If the database server is successfully verified, the master database establishes the master database connection with the database server.

Yet further alternatively, the database server of the system includes a cache module configured for, after establishing the master database connection with the master database by use of the public ID and the public passcode, caching the master database connection with the master database.

Compared to the present techniques, the present disclosure provides for several technical effects. First, after the database server establishes a slave database connection with a slave database corresponding to a client, upon receiving a read request, the database server uses a public ID and a public passcode to establish a master database connection with the master database and sends the client ID to the master database. Upon receiving the client ID, the master database updates the present user's ID (i.e., the public ID) to the client ID, and the access permissions associated with the present user's ID (i.e., the public ID) to the access permissions associated with the client ID such that the client cannot operate against the master database exceeding the access permissions configured for the client and thus the security of the system can be enhanced.

Secondly, after establishing a master database connection with the master database by use of a public ID and a public passcode, the database server caches such master database connection. Subsequently, after establishing a slave database connection with the slave database corresponding to other clients, when the database server receives a write request from those other clients, the database server can communicate with the master database through the cached master database connection. Those subsequent write operations can be performed without executing the verification by use of the public ID and the public passcode or the establishment of a connection with the master database. By doing so, the database server is able to speed up the time to complete a write request. Nevertheless, it is not necessary for embodiments of the present disclosure to incorporate all the effects described above.

DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

In the following description, numerous specific details are set forth in order to provide a thorough understanding of the present disclosure. However, it will become obvious to those skilled in the art that the present disclosure may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments mutually exclusive of other embodiments. Used herein, the terms "upper", "lower", "top", "bottom", "middle", "upwards", and "downwards" are intended to provide relative positions for the purposes of description, and are not intended to designate an absolute frame of reference. Further, the order of blocks in process flowcharts or diagrams representing one or more embodiments of the disclosure do not inherently indicate any particular order nor imply any limitations in the disclosure.

Embodiments of the present disclosure are discussed herein with reference to FIGS. 1-12. However, those skilled in the art will readily appreciate that the detailed description given herein with respect to these figures is for explanatory purposes as the disclosure extends beyond these limited embodiments.

Figure 1:
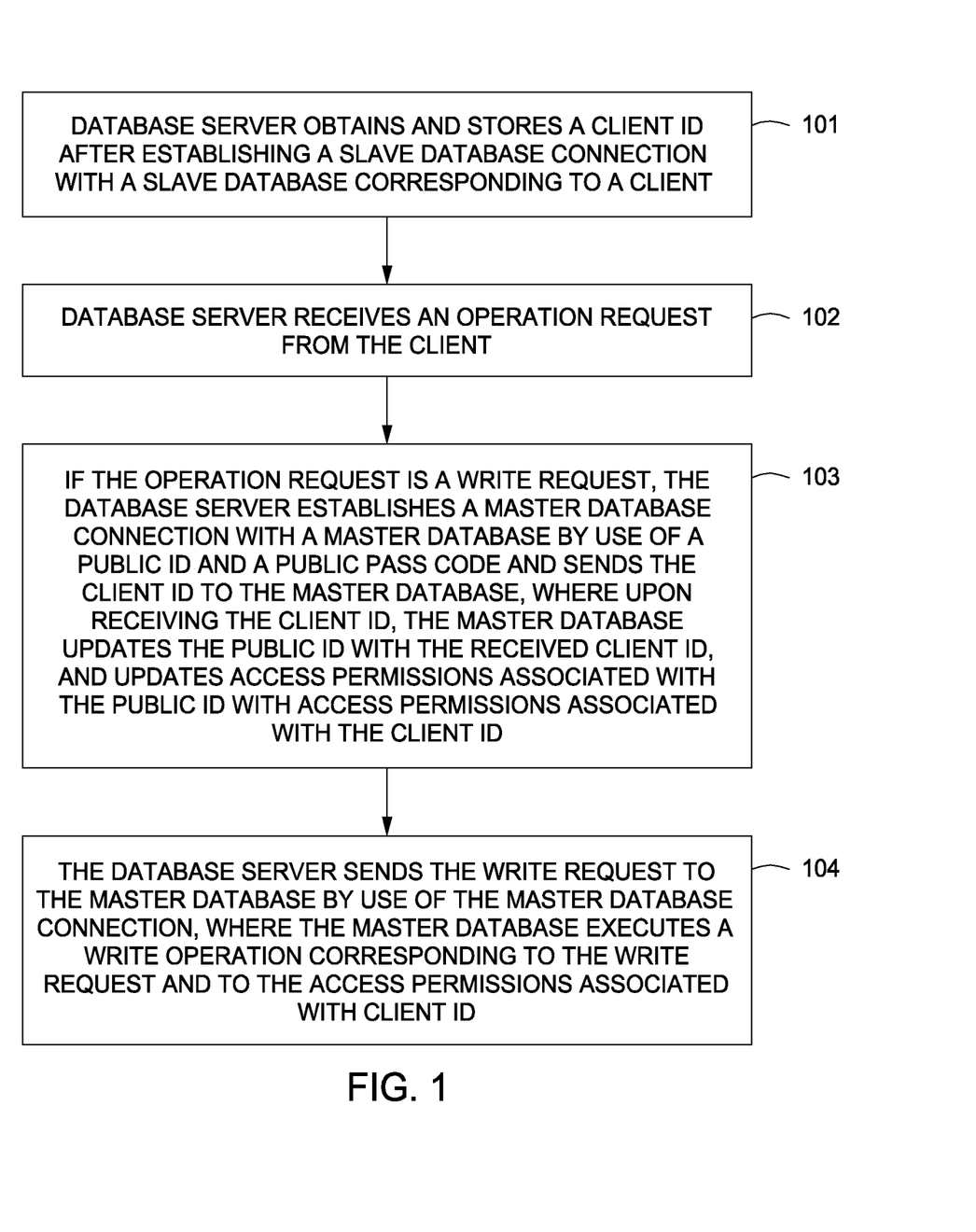
FIG. 1 is a flow chart of a first exemplary method of separating read operations from write operations in accordance with an embodiment of the present disclosure.

Referring to FIG. 1, a flow chart of an exemplary method of separating a read operation from a write operation is shown in accordance with an embodiment of the present disclosure. Method 100 starts in step 101, where database proxy server obtains and stores a client ID after establishing a slave database connection with a slave database corresponding to a client. The client ID is the only identification associated with the client and can be represented in the forms such as the name of the client or the source IP of the client (e.g., username@userhost), etc. In step 102, the database proxy server received from the client operation requests. Operation requests can include read requests and write requests. For example, when the client executes a query statement, a read request is sent accordingly; when the client executes an update statement, a write request is sent instead.

In step 103, when an operation request is a write request, the database proxy server uses a public ID and a public passcode to establish with a master database a master database connection, through which the client ID is sent to the master database. Upon receiving the client ID, the master database updates the present user under the public ID to the received client ID, and the access permissions associated with the present user under the public ID to the access permissions associated with the client ID.

In particular, the public ID is a public account assigned to the database server proxy. The database proxy server sends the public ID and the public passcode to the master database, which verifies the database proxy server based upon the received public ID and public passcode. If the verification is successful, the master database establishes a master database connection with the database proxy server.

After the establishment of the master database connection, the database proxy server can cache such master database connection. In particular, with a cached master database connection, when the database proxy server receives a slave database connection request from other clients, after establishing a slave connection with the slave database corresponding to the clients, and upon receiving a write request from those other clients, the database proxy server can communicate with the master database through the cached master database connection, without executing the establishment of another master database connection or the verification of the master database again by use of the public ID and the public passcode. By doing so, the database proxy server is able to speed up the time to complete write requests.

The master database updates the present user from the public ID to the client ID, and the access permissions for the present user from the access permissions associated with the public ID to the access permissions associated with the client ID. For example, the public user account can be replaced with the client account, for example, by use of a statement "change user to username@userhost."

In step 104, the database proxy server sends the write request through the master database connection to the master database. A write operation to the master database corresponding to the write request and within the access permissions associated with the client ID is executed. In particular, such a write operation can be an operation of INSERT, UPDATE, DELETE, etc.

The connecting with the master database, updating the public ID to the client ID, updating the access permissions associated with the public ID to the access permissions associated with the client ID are all initiated by the database proxy server. Therefore, it is after the database proxy server updates the access permissions associated with the public ID to the ones associated with the client ID that the database proxy server will send the write request through the master database connection to the master database. As a result, a write operation to the master database would not exceed the access permissions associated with the client that sends the write request.

Figure 2:
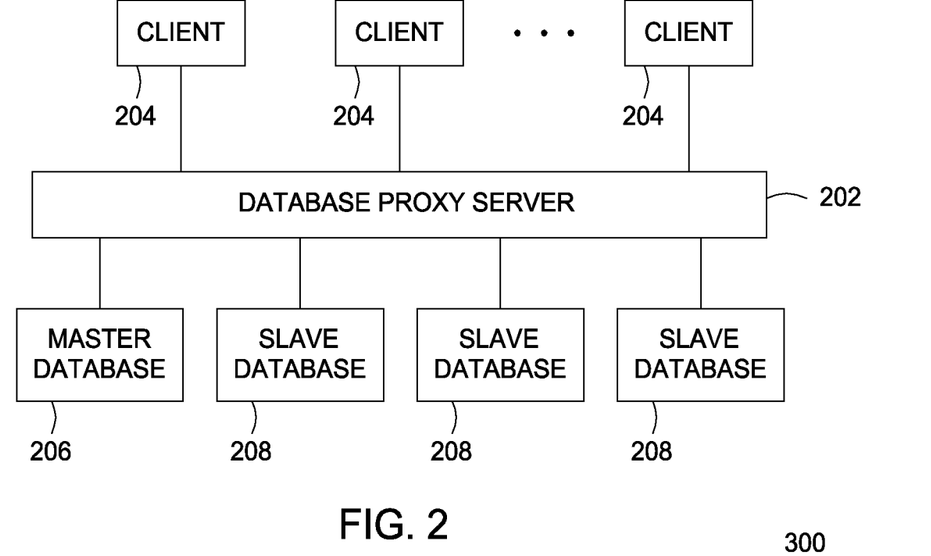
FIG. 2 is an illustration of an exemplary separation of read operations from write operations in accordance with an embodiment of the present disclosure.

Referring to FIG. 2, an illustration of an exemplary separation of read operations from write operations is shown in accordance with an embodiment of the present disclosure. The database server proxy 202 is an intermediary layer between the clients 204 and a database system including the master database (master database) 206 and the plurality of slave databases (slave database) 208. The database proxy server 202 is responsible for receiving requests from the clients 204, and communicating directly with the databases. The database proxy server 202 maintains the meta-data of the databases, including the information such as the physical addresses and status of the data, making the storage distribution of the data in the databases transparent to the clients 204.

Figure 3:
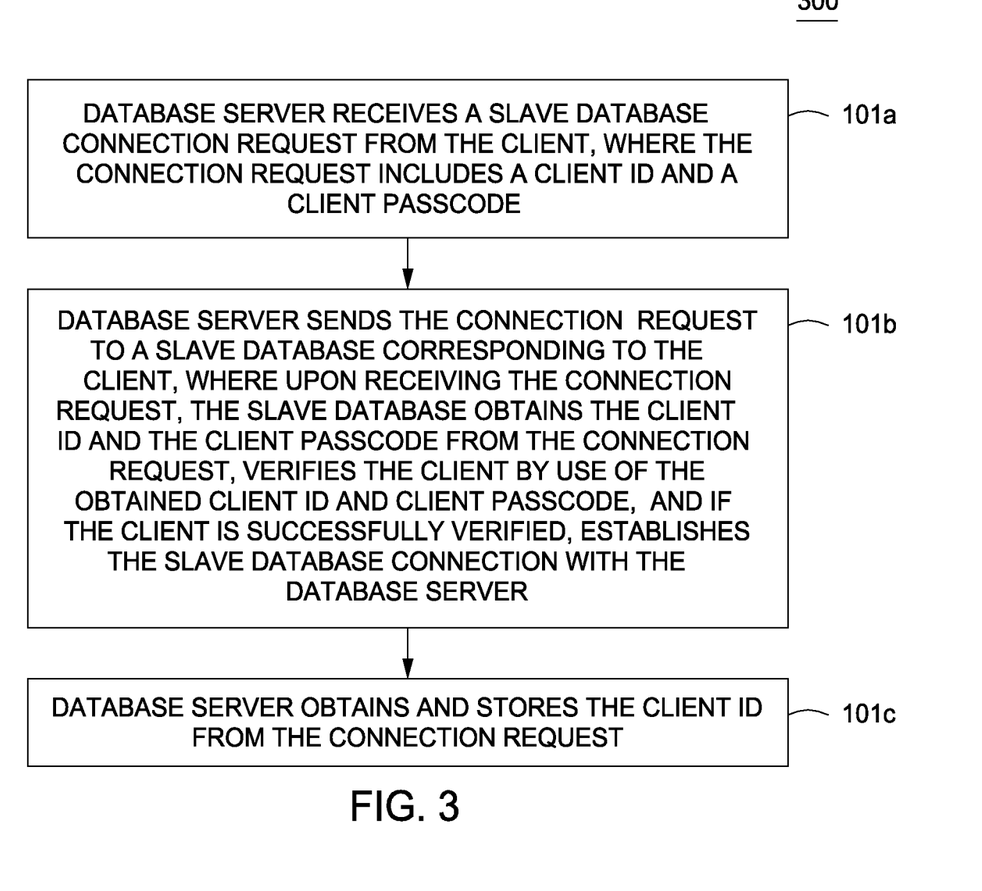
FIG. 3 is a flow chart of a second exemplary method of separating read operations from write operations in accordance with an embodiment of the present disclosure.

Referring to FIG. 3, a flow chart of an exemplary method of separating read operations from write operations is shown in accordance with an embodiment of the present disclosure. Method 300 starts in step 101a, where the database proxy server receives a slave database connection request from a client. The slave database connection request includes a client ID and a client passcode. The client ID can be transmitted without encryption, while the client passcode is transmitted with encryption. The database proxy server can obtain the client ID without decryption from the slave database request.

In step 101b, the database proxy server sends the slave database connection request to the slave database corresponding to the client. The slave database receives the request and obtains the client ID and the client passcode from the request. Based upon the client ID and the client passcode, the client is verified by the slave database. If the verification is successful, the slave database establishes a slave database connection with the database proxy server.

In particular, there are a plurality of slave databases, and the mapping relationship between a client and a slave database can be pre-configured according to the number and/or location of the clients and slave databases. Upon receiving a slave database connection request, the database proxy server sends the request to the slave database corresponding to the client according to the pre-configured mapping relationship.

As the client passcode is transmitted with encryption, the slave database and the database proxy server can have methods for encryption pre-configured for the client. When the slave database receives a request for a slave database connection, it decrypts the request based on the decryption methods corresponding to the pre-configuration to obtain the client passcode from the slave database connection request. Further, the slave database caches a relationship mapping between the client IDs and the client passcodes. The slave database can also query such a mapping to verify the obtained client IDs and client passcodes.

In step 101c, the database proxy server obtains the client ID from the slave database connection request and stores the client ID obtained. In particular, as the client ID is transmitted without encryption, the database proxy server can obtain the client ID directly from the slave database connection request.

Figure 4:
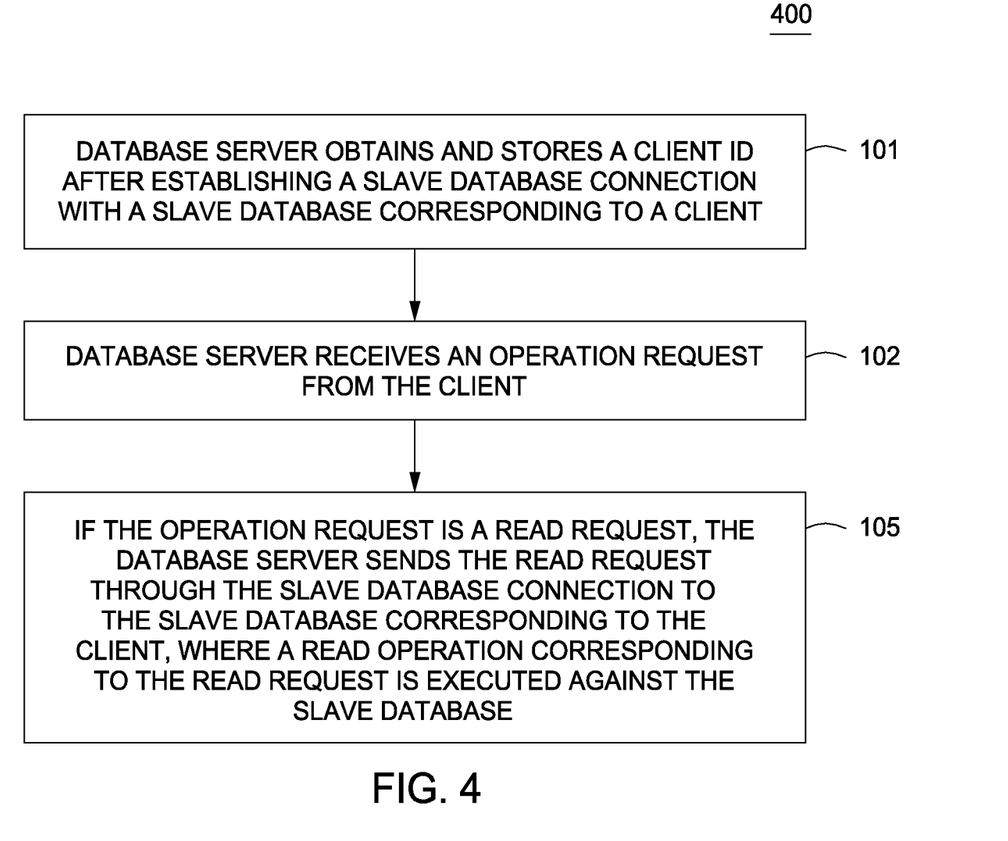
FIG. 4 is a flow chart of a third exemplary method of separating read operations from write operations in accordance with an embodiment of the present disclosure.

Referring to FIG. 4, a flow chart of an embodiment of separating read operations from write operations is shown in accordance with an embodiment of the present disclosure. The database proxy server establishes a slave database connection with a slave database corresponding to the client, obtains and stores the client ID in step 101. After the database proxy server receives an operation request from the client in step 102, when the operation request is a read request, the database proxy server sends the read request through the slave database connection to the slave database corresponding to the client and executes a read operation corresponding to the read request against the slave database in step 105.

In particular, when the operation request is a read request, the database proxy server uses the established slave database connection directly to execute a read operation corresponding to the read request against the slave database. Such read requests include read operations, query operations, etc.

On the other hand, after the database proxy server receives an operation request from the client in step 102, when the operation request is a write request, the database proxy server uses a public ID and a public passcode to establish with a master database a master database connection, through which the client ID is sent to the master database. Upon receiving the client ID, the master database updates the present user's ID (i.e., the public ID) to the received client ID, and the access permissions associated with the present user under the public ID to the access permissions associated with the client ID. Therefore, without the access permissions exceeding the ones associated with the client ID, the client cannot operates against the master database outside the access permissions configured and the security of the system can be enhanced.

After establishing a master database connection with the master database using the public ID and the public passcode, the database proxy server caches the master database connection. When the database proxy server receives write requests from other clients after establishing slave database connections with those clients, it communicates with the master database directly through the cached master database connection, without executing the establishment or the verification by use of the public ID and the public passcode. By doing so, the database server is able to speed up the time to complete write requests.

Figure 5:
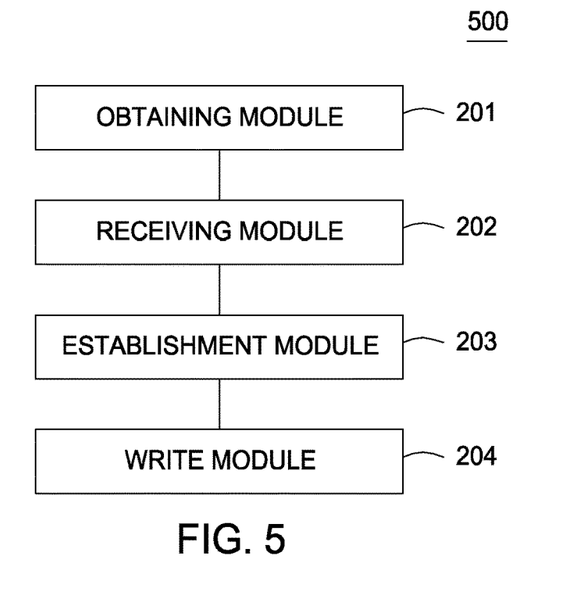
FIG. 5 is a block diagram of a first exemplary database proxy server in accordance with an embodiment of the present disclosure.

Referring to FIG. 5, a block diagram of an exemplary database proxy server is shown in accordance with embodiments of the present disclosure. The database proxy server 500 includes an obtaining module 201, a receiving module 202, an establishment module 203, and a write module 204. The obtaining module 201 is configured for, after the database proxy server establishes a slave database connection with a slave database corresponding to the client, obtaining and storing the client ID. The receiving module 202 is configured for receiving an operation request from the client. The establishment module 203 is configured for, when the operation request is a write request, establishing a master database connection with the master database by use of the public ID and the public passcode such that upon receiving the client ID, the master database updates the present user's ID, i.e., the public ID to the received client ID, the access permissions for the present user associated with the public ID to the access permissions associated with the client ID. The write operation module 204 is configured for sending the write request to the master database through the master database connection, and executing a write operation corresponding to the write request and within the access permissions associated with the client ID.

Further, the obtaining module 201 can also include a receiving module, a sending module and a storing module. The receiving module is configured for receiving from the client a slave database connection request, which includes a client ID and a client passcode. The sending module is configured for sending the slave database connection request to the slave database corresponding to the client such that the slave database receives the request and obtains from the request both the client ID and the client passcode. The slave database further verifies the client based on the obtained client ID and the client passcode. If the client is successfully verified, a slave database connection is established with the database proxy server. The storing module is configured for obtaining the client ID from the slave database connection request and storing the obtained client ID.

Figure 6:
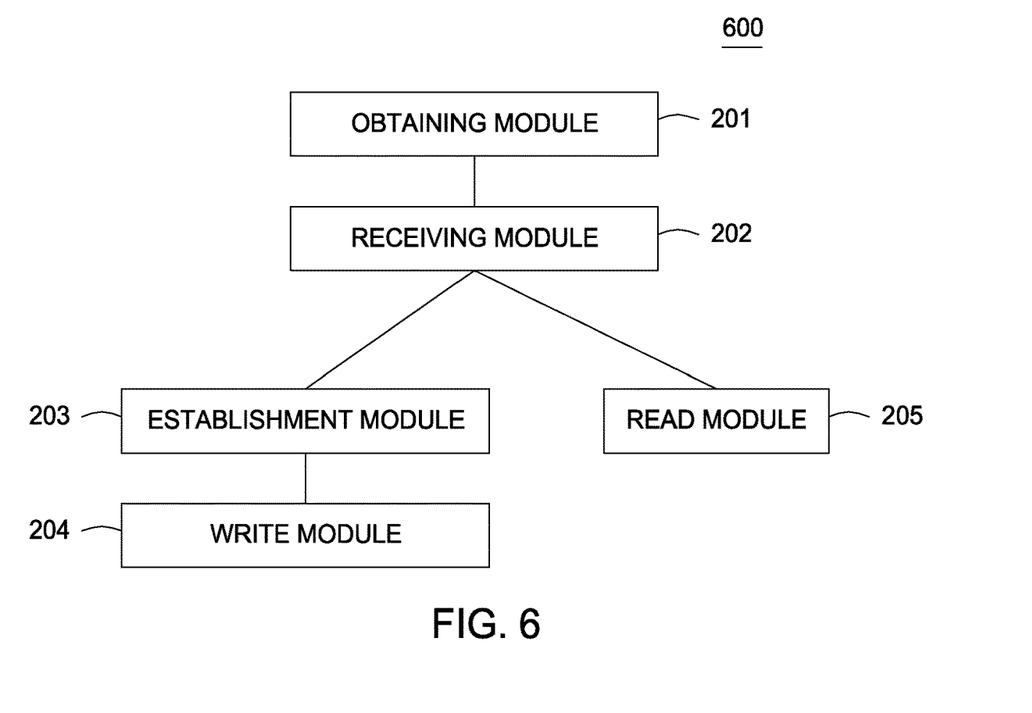
FIG. 6 is a block diagram of a second exemplary database proxy server in accordance with an embodiment of the present disclosure.

Referring to FIG. 6, a block diagram of another exemplary database proxy server is shown in accordance with embodiments of the present disclosure. The database proxy server 600 includes a read operation module 205 in addition to an obtaining module 201, a receiving module 202, an establishment module 203 and a write module 204. The read operation module is configured for, when the operation request is a read request, sending the read request through the slave database connection to the slave database corresponding to the client, and executing against the slave database a read operation corresponding to the read request.

Further, the establishment module 203 can include a setup module configured for sending the public ID and the public passcode to the master database such that upon receiving, the master database uses the public ID and the public passcode to verify the database proxy server. If the verification is successful, the master database establishes a master database connection with the database proxy server.

Figure 7:
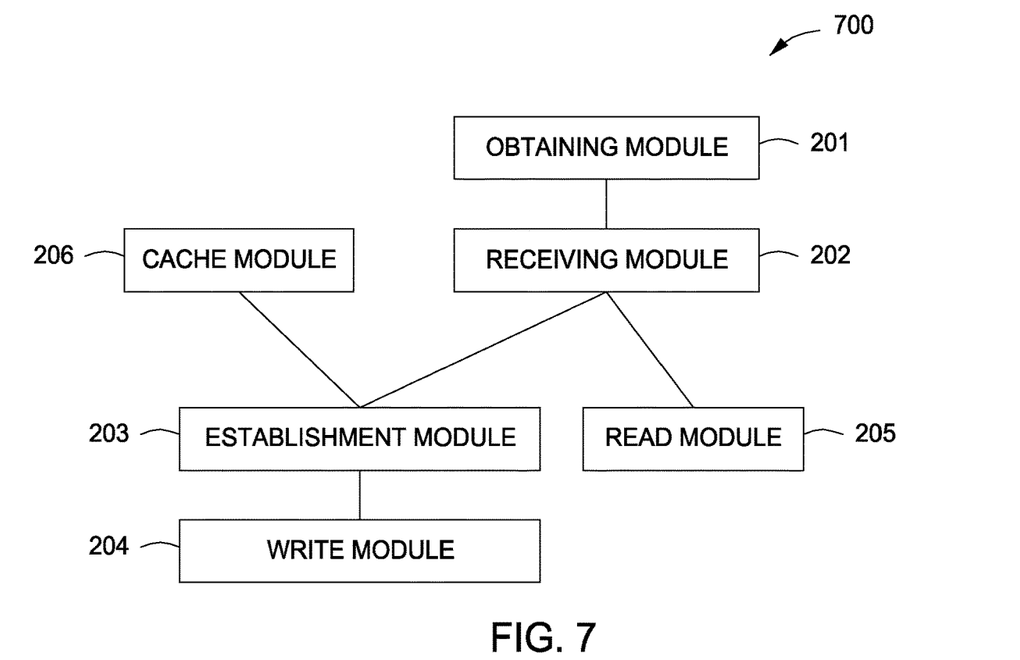
FIG. 7 is a block diagram of a third exemplary database proxy server in accordance with an embodiment of the present disclosure.

Referring to FIG. 7, a block diagram of another exemplary database proxy server is shown in accordance with embodiments of the present disclosure. The database proxy server 700 includes a cache module 206 in addition to an obtaining module 201, a receiving module 202, an establishment module 203, a write operation module 204 and a read operation module 205. The cache module 206 is configured for, after establishing a master database connection with the master database by use of the public ID and the public passcode, caching the master database connection with the master database.

In accordance with embodiments of the method of separating read operations from write operations of the present disclosure, the database proxy server establishes a slave database connection with a slave database corresponding to the client. When the operation request is a write request, the database proxy server uses a public ID and a public passcode to establish with a master database a master database connection, through which the client ID is sent to the master database. Upon receiving the client ID, the master database updates the present user's ID, i.e., the public ID to the received client ID, and the access permissions for the present user associated with the public ID to the access permissions associated with the client ID. Therefore, without the access permissions exceeding the ones associated with the client ID, the client cannot operates against the master database outside the access permissions and the security of the system can be enhanced.

After establishing a master database connection with the master database using the public ID and the public passcode, the database proxy server caches the master database connection. When the database proxy server receives write requests from other clients after establishing slave database connections with those clients, it communicates with the master database directly through the cached master database connection, without executing the establishment or the verification by use of the public ID and the public passcode. By doing so, the database server is able to speed up the time to complete write requests.

Figure 8:
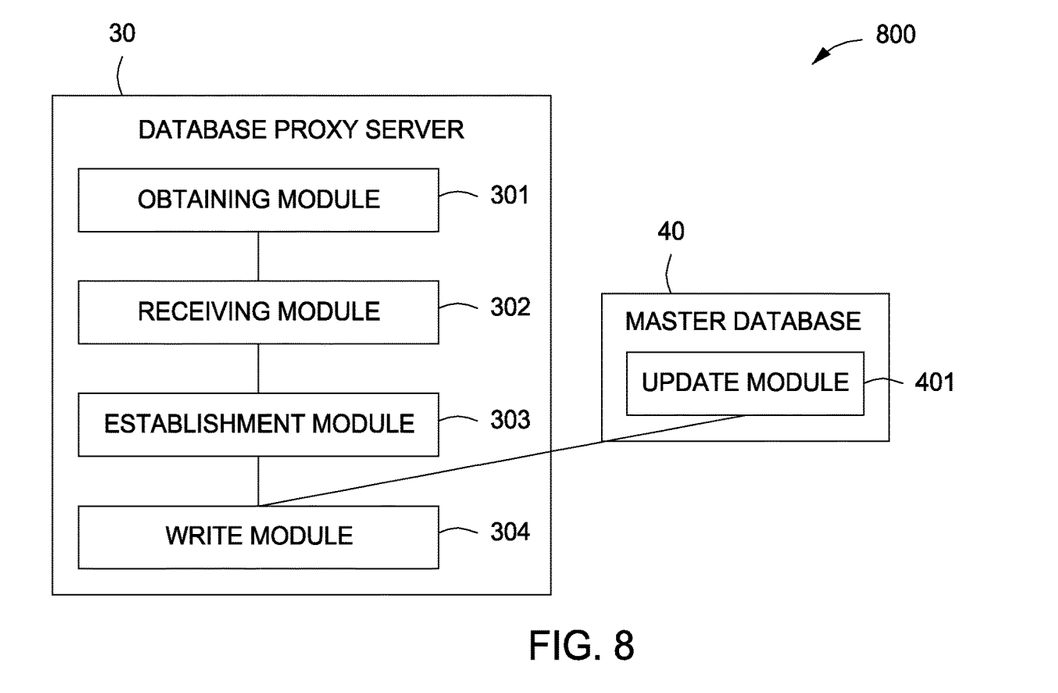
FIG. 8 is a system block diagram of a first exemplary system of separation of read operations from write operations in accordance with an embodiment of the present disclosure.

Referring to FIG. 8, a block diagram of an exemplary system for separating read operations from write operations is shown in accordance with embodiments of the present disclosure. The system 800 includes a database proxy server 30 and a master database 40. The database proxy server 30 includes an obtaining module 301, a receiving module 302, an establishment module 303 and a write operation module 304. The obtaining module 301 is configured for, after the database proxy server 30 establishing a slave database connection with a slave database 50 corresponding to the client, obtains and stores the client ID. The receiving module 302 is configured for receiving an operation request from the client. The establishment module 303 is configured for, when the operation request is a write request, establishing a master database connection with the master database 40 by use of the public ID and the public passcode, and sending the client ID to the master database 40.

The master database 40 includes an update module 401, configured for receiving the client ID, updating the present user's ID, i.e., the public ID to the received client ID, and updating the present user's access permissions for the present user associated with the public ID to the access permissions associated with the client ID.

The write operation module 304 is configured for, after the update module 401 of the master database 40 updates the access permissions associated with the present user under the public ID to the ones associated with the client ID, sending the write request to the master database 40 through the master database connection, and executing a write operation corresponding to the write request and within the access permissions associated with the client ID to the master database 40.

Further, the obtaining module 301 can include a receiving module, a sending module and a storing module. The receiving module is configured for receiving from the client a slave database connection request, which includes a client ID and a client passcode. The sending module is configured for sending the slave database connection request to the slave database 50 corresponding to the client.

Figure 9:
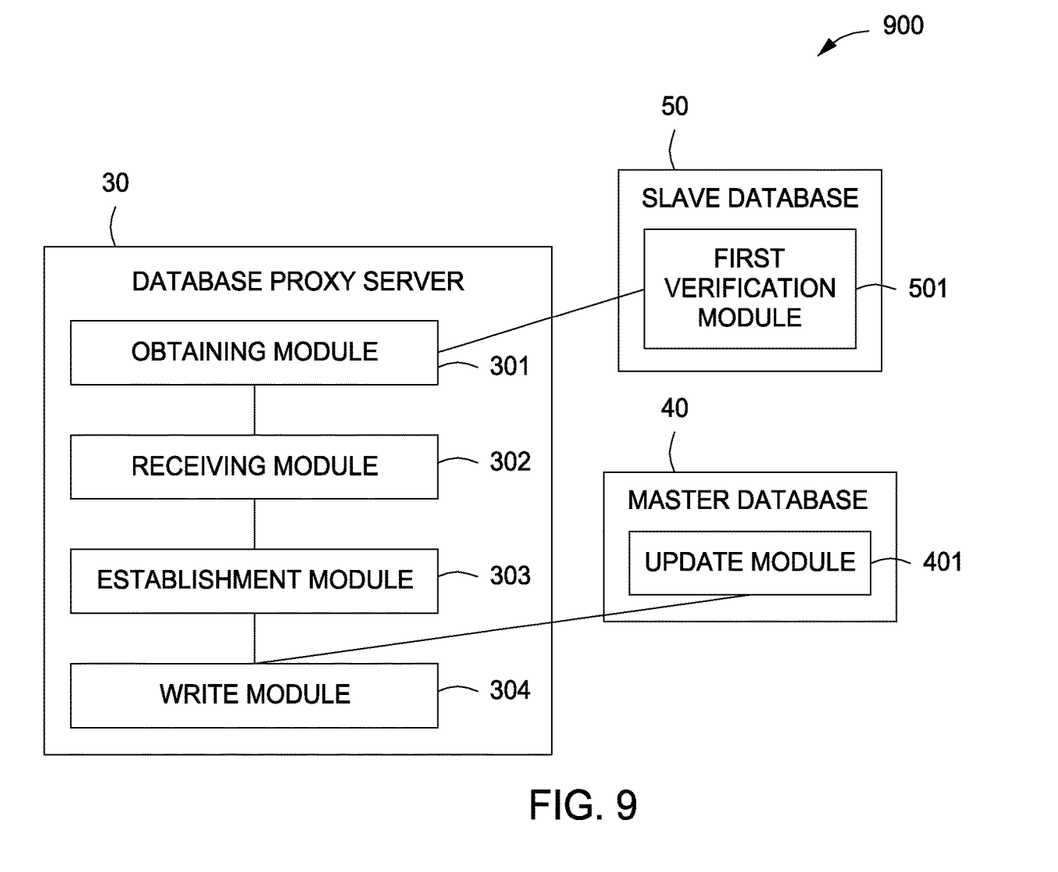
FIG. 9 is a system block diagram of a second exemplary system of separation of read operations from write operations in accordance with an embodiment of the present disclosure.

Referring to FIG. 9, a block diagram of another exemplary system for separating read operations from write operations is shown in accordance with embodiments of the present disclosure. The system 900 includes a slave database 50 including a first verification module 501, in addition to a database proxy server 30 and a master database 40. The database proxy server 30 includes an obtaining module 301, a receiving module 302, an establishment module 303 and a write operation module 304. The master database 40 includes an update module 401.

Correspondingly, the obtaining module 301 also includes a storing module configured for, after the first verification module 501 of the slave database 50 establishes a slave database connection with the database proxy server 30, obtaining the client ID from the slave database connection request, and storing the obtained client ID.

Figure 10:
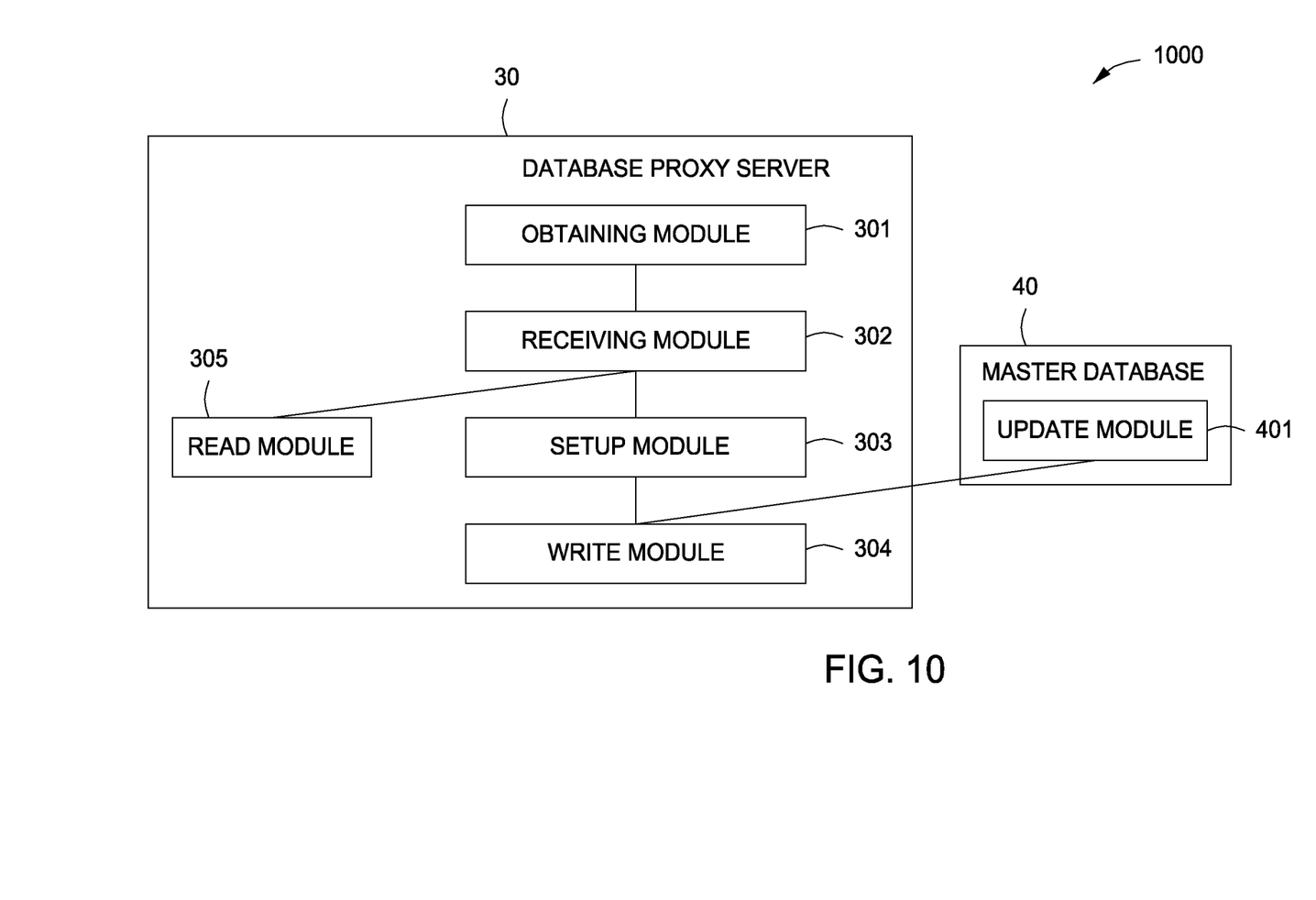
FIG. 10 is a system block diagram of a third exemplary system of separation of read operations from write operations in accordance with an embodiment of the present disclosure.

Referring to FIG. 10, a block diagram of another exemplary system for separating read operations from write operations is shown in accordance with embodiments of the present disclosure. The system 1000 includes a database proxy server 30 including a read operation module 305 in addition to a master database 40. The database proxy server 30 also includes an obtaining module 301, a receiving module 302, an establishment module 303 and a write operation module 304. The master database 40 includes an update module 401. The read module 305 is configured for, when the operation request is a read request, sending the read request through the slave database connection to the slave database 50 corresponding to the client, and executing a read operation corresponding to the read request against the slave database 50. Correspondingly, the establishment module 303 includes a setup module configured for sending the public ID and the public passcode to the master database 40.

Figure 11:
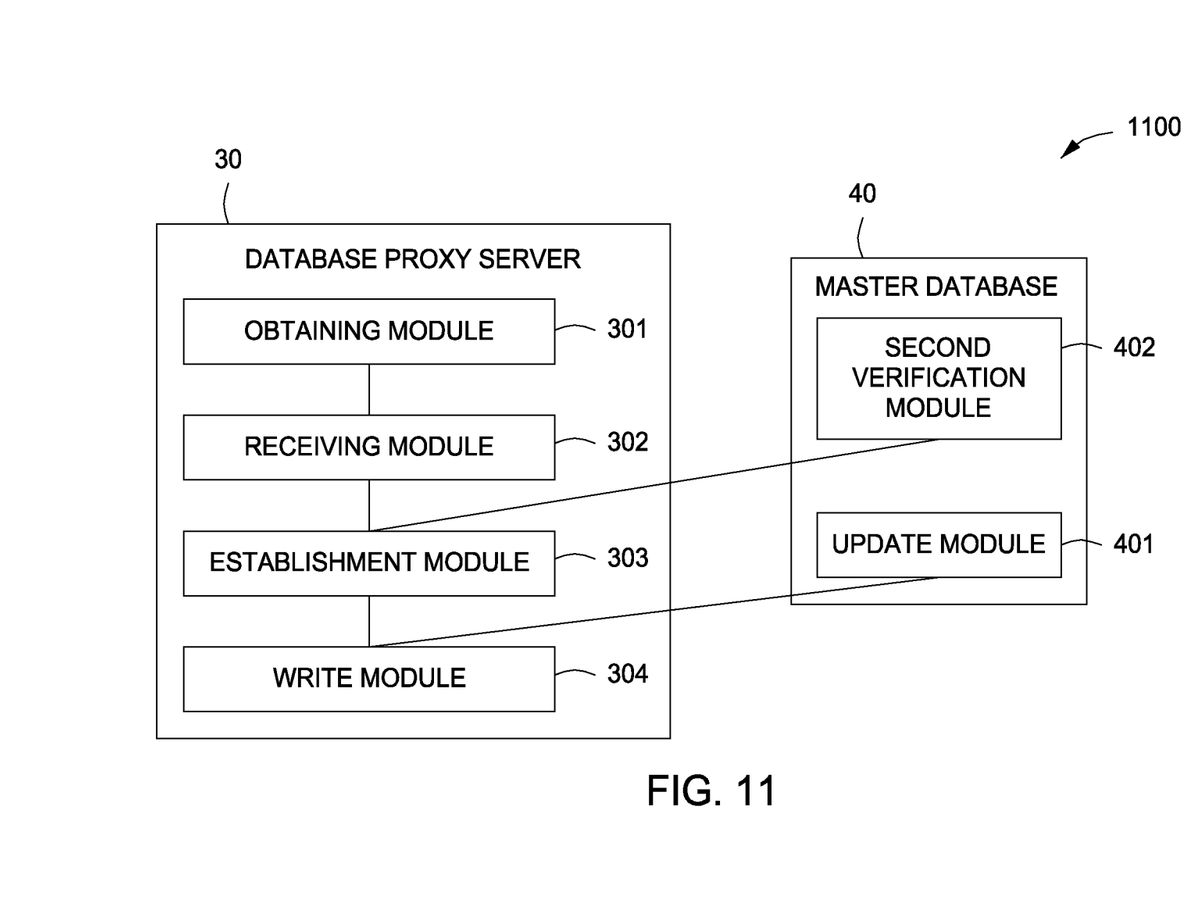
FIG. 11 is a system block diagram of a fourth exemplary system of separation of read operations from write operations in accordance with an embodiment of the present disclosure.

Referring to FIG. 11, a block diagram of another exemplary system for separating read operations from write operations is shown in accordance with embodiments of the present disclosure. The system 1100 includes a second verification module 402 of the master database 40. The database proxy server 30 includes an obtaining module 301, a receiving module 302, an establishment module 303 and a write operation module 304. The second verification module 402 is configured for receiving the public ID and the public passcode, and verifying the database proxy server 30 based on the received public ID and the public passcode. If the verification is successful, a master database connection is established with the database proxy server 30.

Figure 12:
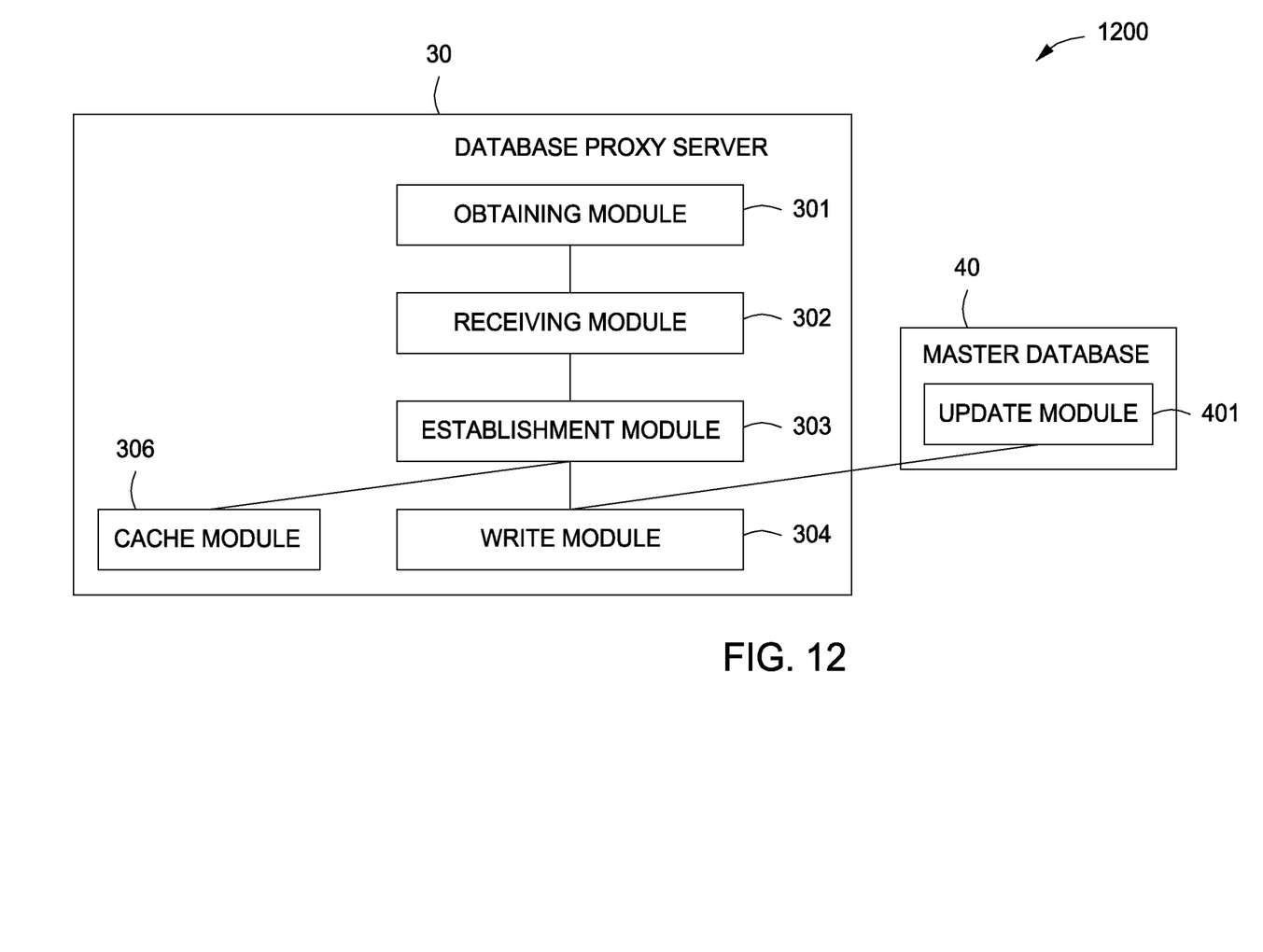
FIG. 12 is a system block diagram of a fifth exemplary system of separation of read operations from write operations in accordance with an embodiment of the present disclosure.

Referring to FIG. 12, a block diagram of another exemplary system for separating read operations from write operations is shown in accordance with embodiments of the present disclosure. The system 1200 includes a cache module 306 of the database proxy server 30. The database proxy server 30 also includes an obtaining module 301, a receiving module 302, an establishment module 303 and a write operation module 304. The master database 40 includes an update module 401. The cache module 306 is configured for, after establishing a master database connection with the master database 40 by use of the public ID and the public passcode, caching the master database connection.

In accordance with embodiments of the method of separating read operations from write operations of the present disclosure, the database proxy server establishes a slave database connection with a slave database corresponding to the client. When the operation request is a write request, the database proxy server uses a public ID and a public passcode to establish with a master database a master database connection, through which the client ID is sent to the master database. Upon receiving the client ID, the master database updates the present user's ID, i.e., the public ID to the received client ID, and the access permissions associated with the present user under the public ID to the access permissions associated with the client ID. Therefore, without the access permissions exceeding the ones associated with the client ID, the client cannot operates against the master database outside the configured access permissions and the security of the system can be enhanced.

After establishing a master database connection with the master database using the public ID and the public passcode, the database proxy server caches the master database connection. When the database proxy server receives write requests from other clients after establishing slave database connections with those clients, it communicates with the master database directly through the cached master database connection, without executing the establishment or the verification processes by use of the public ID and the public passcode. By doing so, the database server is able to speed up the time to complete write request.

The database proxy server and the system for separating read operations from write operations correspond to the method of separating read operations from write operations, details are substantially the same as illustrated above and will not be repeated here. Further, the method of separating read operations from write operations can also be applied to multiple clients having different access permissions, as well as multiple cloud based clients.

Embodiments of the present disclosure can be implemented using software, hardware, firmware, and/or the combinations thereof. Regardless of being implemented using software, hardware, firmware or the combinations thereof, instruction code can be stored in any kind of computer readable media (for example, permanent or modifiable, volatile or non-volatile, solid or non-solid, fixed or changeable medium, etc.). Similarly, such medium can be implemented using, for example, programmable array logic (PAL), random access memory (RAM), programmable read only memory (PROM), read only memory (ROM), electrically erasable programmable ROM (EEPROM), magnetic storage, optical storage, digital versatile disc (DVD), or the like.

It is necessary to point out that, modules or blocks described by embodiments of the present disclosures are logical modules or logical blocks. Physically, a logical module or logical block can be a physical module or a physical block, a part of a physical module or a physical block, or the combinations of more than one physical modules or physical blocks. Physical implementation of those logical module or logical blocks is not of essence. The realized functionalities realized by the modules, blocks and the combinations thereof are key to solving the problems addressed by the present disclosure. Further, in order to disclose the novelties of the present disclosure, the above described embodiments do not disclose about those modules or blocks not too related to solving the problems addressed by the present disclosure, which does not mean that the above described embodiments cannot include other modules or blocks.

It is also necessary to point out that, in the claims and specification of the present disclosure, terms such as first and second only are for distinguishing an embodiment or an operation from another embodiment or operation. It does not require or imply that those embodiments or operations having any such real relationship or order. Further, as used herein, the terms "comprising," "including," or any other variation intended to cover a non-exclusive inclusion, such that a process, method, article, or apparatus that comprises a list of elements does not include only those elements but may include other elements not expressly listed or inherent to such process, method, article, or apparatus. Absent further limitation, elements recited by the phrase "comprising a" does not exclude a process, method, article, or apparatus that comprises such elements from including other same elements.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable medium used to actually carry out the distribution. The embodiments disclosed herein may also be implemented using software modules that perform certain tasks. These software modules may include script, batch, or other executable files that may be stored on a computer-readable storage media or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the present disclosure and its advantages have been described in detail, it should be understood that various changes substitutions, and alterations can be made herein without departing from the spirit and scope of the disclosure as defined by the appended claims. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Embodiments according to the present disclosure are thus described. While the present disclosure has been described in particular embodiments, it should be appreciated that the disclosure should not be construed as limited by such embodiments, but rather construed according to the below claims.

What is claimed is:

1. A method of operating a database system, the method comprising:
   a computer server receiving a client connection request from a client device, the client connection request including a client ID and a password;
   the computer server sending a slave connection request in response to the client connection request to a client read-only slave database, the slave connection request including the client ID and the password, the client read-only slave database having identical datasets as a client write-only master database;
   the computer server receiving a response to the slave connection request from the client read-only slave database that establishes a slave database connection with the client read-only slave database when the client read-only slave database verifies the client ID and the password, and storing the client ID as a stored client ID after the slave database connection has been established;
   the computer server receiving a write request from the client device, the write request including the client ID;
   the computer server sending a master connection request to the client write-only master database, the master connection request including a public ID and a public passcode;
   the computer server receiving a response to the master connection request from the client write-only master database that establishes a master database connection with the client write-only master database when the client write-only master database verifies the public ID and the public passcode;
   the computer server sending the client ID and an access permission associated with the client ID to the client write-only master database by way of the master database connection; and
   the computer server sending the write request to the client write-only master database after the client ID has been sent to the client write-only master database, the client write-only master database preventing the client device from writing to areas that have not been assigned to the client device based on the access permission associated with the client ID.

2. The method of claim 1, further comprising the computer server sending the master connection request only when the client ID included in the write request matches the stored client ID.

3. The method of claim 1, further comprising:
the computer server receiving a read request from the client device after the client ID and password have been verified to be valid, the read request including the client ID; and
the computer server sending the read request to the client read-only slave database only when the client ID included in the read request matches the stored client ID.

4. The method of claim 1, wherein the method further comprises the computer server determining the client read-only slave database from a plurality of client read-only slave databases based on the client ID.

5. The method of claim 1, further comprising the computer server caching the connection with the client write-only master database.

6. A non-transitory machine-readable storage medium having embedded therein program instructions, which when executed by a processor causes the processor to execute a method of operating a database system, the method comprising:
receiving a client connection request from a client device, the client connection request including a client ID and a password;
sending a slave connection request in response to the client connection request to a client read-only slave database, the slave connection request including the client ID and the password, the client read-only slave database having identical datasets as a client write-only master database;
receiving a response to the slave connection request from the client read-only slave database that establishes a slave database connection with the client read-only slave database when the client read-only slave database verifies the client ID and the password;
storing the client ID as a stored client ID after the slave database connection has been established;
receiving a write request from the client device, the write request including the client ID;
sending a master connection request to the client write-only master database, the master connection request including a public ID and a public passcode;
receiving a response to the master connection request from the client write-only master database that establishes a master database connection with the client write-only master database when the client write-only master database verifies the public ID and the public passcode;
sending the client ID and an access permission associated with the client ID to the client write-only master database by way of the master database connection; and
sending the write request to the client write-only master database after the client ID has been sent to the client write-only master database, the client write only master database preventing the client device from writing to areas that have not been assigned to the client device based on the access permission associated with the client ID.

7. The medium of claim 6, wherein the method further comprises sending the master connection request only when the client ID included in the write request matches the stored client ID.

8. The medium of claim 6, wherein the method further comprises:
receiving a read request from the client device after the client ID and password have been verified to be valid, the read request including the client ID; and
sending the read request to the client read-only slave database only when the client ID included in the read request matches the stored client ID.

9. The medium of claim 6, wherein the method further comprises determining the client read-only slave database from a plurality of client read-only slave databases based on the client ID.

10. The medium of claim 6, wherein the method further comprises caching the connection with the client write-only master database.

11. A database system comprising:
a client write-only master database;
a client read-only slave database, the client read-only slave database having identical datasets as the client write-only master database; and
a proxy server coupled to the client write-only master database and the client read-only slave database,
the proxy server to:
receive a client connection request from a client device, the client connection request including a client ID and a password;
send a slave connection request in response to the client connection request to the client read-only slave database, the slave connection request including the client ID and the password;
the client read-only slave database to receive the slave connection request, verify the client ID and the client passcode, and output a response to the slave connection request to establish a slave database connection with the proxy server when the client read-only slave database verifies the client ID and client passcode;
the proxy server to:
receive the response to the slave connection request from the client read-only slave database that establishes the slave database connection with the client read-only slave database when the client read-only slave database verifies the client ID and the password;
store the client ID as a stored client ID after the slave database connection has been established;
receive a write request from the client device, the write request including the client ID;
send a master connection request to the client write-only master database, the master connection request including a public ID and a public passcode;
the client write-only master database to receive the master connection request, verify the public ID and the public passcode, and output a response to establish a master database connection with the proxy server when client write-only master database verifies the public ID and public passcode;
the proxy server to:
receive the response to the master connection request from the client write-only master database that establishes the master database connection with the client write-only master database when the client write-only master database verifies the public ID and the public passcode;

send the client ID and an access permission associated with the client ID to the client write-only master database by way of the master database connection; and send the write request to the client write-only master database after the client ID has been sent to the client write-only master database; and the client write-only master database to prevent the client device from writing to areas that have not been assigned to the client device based on the access permission associated with the client ID.

12. The system of claim 11, wherein the client write-only master database comprises:

a processor; and a non-transitory computer-readable medium coupled to the processor, the non-transitory computer-readable medium having computer-readable instructions stored thereon to be executed when accessed by the processor, the instructions comprising:

receiving the client ID as a received client ID and updating the public ID with the received client ID, and updating an access permission associated with the public ID with the access permission associated with the client ID.

13. The system of claim 12, wherein the proxy server to further determine whether the client ID included in the write request matches the stored client ID before the master connection request is sent.

14. The system of claim 13 wherein the database system includes a plurality of client read-only slave databases, and the proxy server to determine the client read-only slave database from the plurality of client read-only slave databases based on the client ID.

15. The system of claim 12, wherein the proxy server to further:

receive a read request from the client device after the client ID and password have been verified to be valid, the read request including the client ID; and send the read request to the read-only slave database that corresponds with the client ID.

16. The system of claim 12, wherein the client write-only master database receives a subsequent client ID from the proxy server, updates the received client ID with the subsequent client ID, and updates the access permission associated with the client ID with an access permission associated with the subsequent client ID.

17. The system of claim 12 wherein the proxy server to further cache the connection with the client write-only master database.

* * * * *